(12) United States Patent
Genot et al.

(10) Patent No.: US 6,639,398 B2
(45) Date of Patent: Oct. 28, 2003

(54) MAGNETIC SENSOR THAT CONCENTRATES MAGNETIC FLUX IN AN AIR GAP

(75) Inventors: Bernard Genot, St. Marcel-Paulel (FR); Philippe Morisset, Kourou (FR); Gerard Mouaici, Toulouse (FR)

(73) Assignee: Siemens VDO Automotive, Toulouse (FR)

(*) Notice: Subject to any disclaimer, the term of this patent is extended or adjusted under 35 U.S.C. 154(b) by 0 days.

(21) Appl. No.: 10/237,671

(22) Filed: Sep. 10, 2002

(65) Prior Publication Data

US 2003/0048100 A1 Mar. 13, 2003

(30) Foreign Application Priority Data

Sep. 11, 2001 (FR) .............................. 01 11724

(51) Int. Cl.$^7$ .............................. G01B 7/14; G01R 33/06
(52) U.S. Cl. .............................. 324/207.2; 324/207.22; 324/207.24
(58) Field of Search .............................. 324/207.2, 207.22, 324/207.23, 207.24, 207.25, 207.26, 207.11, 207.13, 232, 235, 239, 260; 338/32 M

(56) References Cited

U.S. PATENT DOCUMENTS 4,339,875 A * 7/1982 Miller ....................... 29/602.1
5,359,288 A * 10/1994 Riggs et al. ............ 324/207.22
5,532,585 A * 7/1996 Oudet et al. ............ 324/207.22

FOREIGN PATENT DOCUMENTS

| DE | 29 23 644 | 12/1979 |
|----|-----------|---------|
| DE | 200 03 631 | 9/2000 |
| EP | 02 075901 | 3/1990 |
| EP | 0 798 541 | 10/1997 |
| GB | 2 137 020 | 9/1984 |

* cited by examiner

*Primary Examiner*—N. Le
*Assistant Examiner*—Subhash Zaveri
(74) *Attorney, Agent, or Firm*—Young & Thompson

(57) ABSTRACT

A magnetic sensor includes first and second members movable relative to each other. One of the members is secured to a movable member and the other fixed. The first member defines a magnetic circuit with an air gap provided with a detector sensitive to the magnetic induction prevailing in the air gap. The second member is a permanent magnet in magnetic coupling relation with the first member. The first member has a tubular portion and a rod-shaped portion, the portions being magnetically coupled, at one end, by the permanent magnet with radial magnetization and, at the other end, by elements for concentrating the magnetic flux in the air gap. The air gap is delimited by these concentration elements and the facing end of the rod-shaped portion of the first member.

12 Claims, 1 Drawing Sheet

FIG.:1B

MAGNETIC SENSOR THAT CONCENTRATES MAGNETIC FLUX IN AN AIR GAP

FIELD OF THE INVENTION

The present invention relates to a sensor of the position of a moving member over a trajectory followed by this moving member.

BACKGROUND OF THE INVENTION

There is known, particularly from DE-A-29 23 644 or EP-A-798 541, such a sensor comprising first and second members movable relative to each other, one of the members being secured to the movable member and the other fixed. The first member defines a magnetic circuit having one or several air gaps of which at least one is provided with a sensor delivering a signal representative of the magnetic induction prevailing in this air gap. Such a sensor can be constituted for example by a Hall effect sensor or by an electrical resistance sensitive to induction, as is well known.

The second member comprises a permanent magnet in coupled relation with the magnetic circuit of the first member, so as to induce by its poles a magnetic flow in this circuit. The intensity of the magnetic flow induced is a function of the relative position of the members, and hence of the position of the movable member over its trajectory. The sensor disposed in the air gap delivers a signal proportional to this intensity to electronic means which derive a measurement from this position.

The known sensors of this type are subject to the sensitivity of the sensor used. When the latter is a Hall effect sensor, in particular, it functions satisfactorily only if the permanent magnet is capable of introducing the sensor into a region in which the magnetic induction is of the order of 10 mT, at least. It is necessary for this purpose to use magnets made of costly material.

In certain industries, such as the automotive industry, this is not compatible with the objectives of controlled cost production which most often obtain in mass produced goods for the public at large.

SUMMARY OF THE INVENTION

The present invention thus has for its object to provide a sensor of the type described above, operating satisfactorily with permanent magnets of low cost, such as ferrite magnets, for example.

This object of the invention is achieved, as well as others which will become apparent from a reading of the description which follows, with a magnetic sensor of the position of a movable member over a path followed by the movable member, comprising first and second members movable relative to each other, one of the members being secured to said movable member and the other fixed, said first member defining a circuit of ferromagnetic material having at least one air gap provided with a sensor delivering a signal representative of the magnetic induction prevailing in said air gap, said second member comprising a permanent magnet in magnetic coupling relation with said first member to close said magnetic circuit, the sensor being characterized in that the first piece comprises a tubular portion and a portion in the form of a rod extending along the axis of said tubular portion, said portions being magnetically coupled, at one end, by said second member of which said permanent magnet has a radial supply and, at the other end, by means for concentrating magnetic flux in said air gap, this latter being delimited by said concentration means at the end facing the portion in the form of a rod of said first member.

As will be seen later in greater detail, the mentioned flux concentration permits causing the sensor that is used to function correctly, particularly when the latter is of the Hall effect type, and this although this sensor incorporates a permanent magnet whose production cost is low, such as a ferrite magnet for example.

According to other characteristics, which are optional, of the sensor according to the invention:

the concentration means have, in a section through a plane perpendicular to the axis of the first member, a surface which decreases as the section approaches the air gap, the surface of the terminal section of said concentration means is greater than that of the sensitive surface of the sensor, the sensor is a Hall effect sensor, the permanent magnet is of elongated shape, complementary to that of the tubular portion of the first member, so as to be able to enter the latter, the portion in the form of a rod of this member passing through an axial hole of the magnet, the permanent magnet has the shape of an annular ring pierced by a central hole, the ring being associated with first and second tubular magnetic flux guides, coaxial to the ring and fixed to this latter at the periphery of the hole and of the periphery of the ring respectively, said first and second tubular guides being axially movable with the ring relative to said portions in the form of a rod and a tube, respectively, of said first member.

BRIEF DESCRIPTION OF THE DRAWINGS

Other characteristics and advantages of the present invention will become apparent from a reading of the description which follows and a study of the accompanying drawing, in which:

FIG. 1B is a cross-section along the line S—S in FIG. 1.

DETAILED DESCRIPTION OF THE INVENTION

Figure 1:
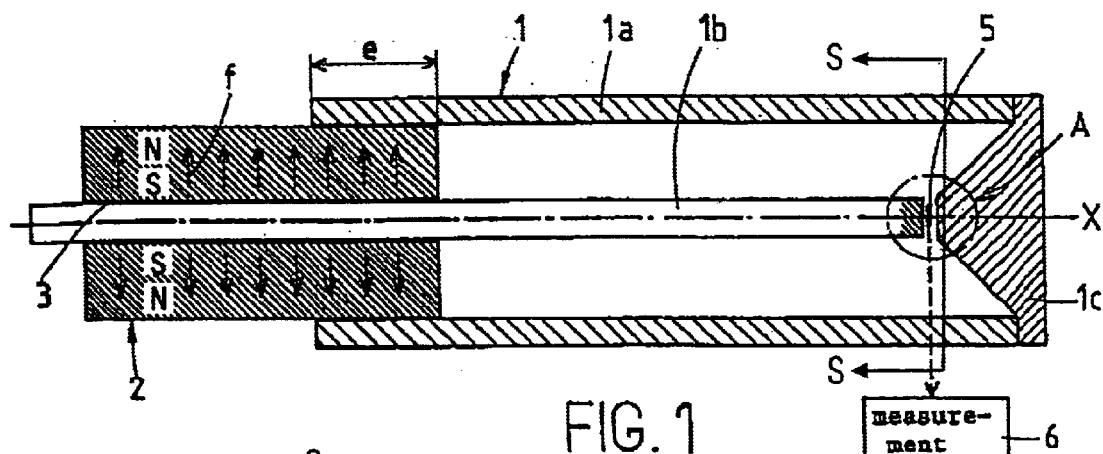
FIG. 1 is a schematic view in axial cross-section of a first embodiment of sensor according to the invention.

Referring to FIG. 1 of the accompanying drawing, it will be seen that the illustrated sensor comprises first and second members 1 and 2, respectively, movable relative to each other, either one of the two members being secured to a movable member, by means not shown, whilst the other is fixed relative to this movable member.

The member 1 is made of a ferromagnetic material, such as soft iron for example, so as to constitute a magnetic circuit. To do this, it comprises a tubular portion 1a, preferably a cylinder of revolution, and a portion 1b in the form of a straight rod which extends along the axis X of the cylindrical portion 1a.

The portion 1b in the form of a rod extends from a closed end 1c of the first tubular portion 1a to beyond an open opposite end of this portion 1a.

The member 2 is constituted by a permanent magnet of elongated shape, substantially complementary to that of the internal wall of the tubular portion 1a of the member 1, so as to be able to enter this latter. It is thus a cylinder of revolution in the illustrated embodiment, of an external diameter slightly less than the diameter of the internal wall of the portion 1a.

It is also pierced by an axial hole 3 traversed by the portion 1b in the form of a rod of the member 1. This portion 1b thus serves as a guide for movement of the magnet 2 along the axis X, as well outside the portion 1a of the piece 1 as within the latter.

The permanent magnet 2 is of radial supply, as shown by the radial arrows f oriented from the South to the North from the hole 3 toward the external surface of the magnet.

Figure 1A:
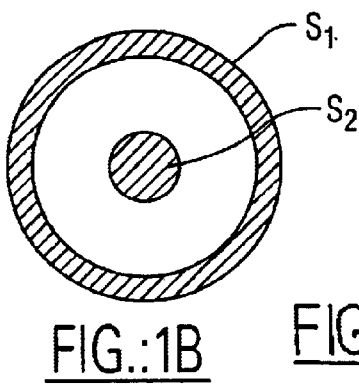
FIG. 1A is an enlarged view of detail A of FIG. 1.
Figure 1A:
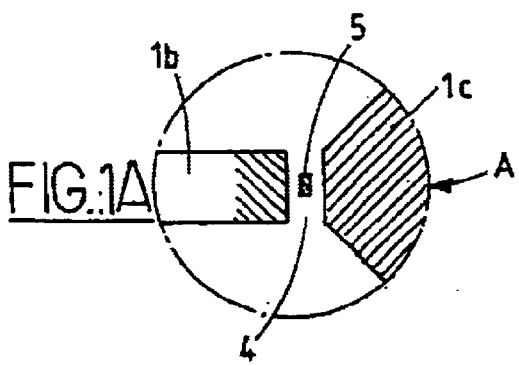

It will be understood that such radial magnetization permits inducing in all the cylindrical portion 1a of the member 1 a magnetic flux whose lines of force form a loop through the South pole S by means of the bottom 1c of the rod-shaped portion 1b, crossing an air gap 4 delimited on one side by the bottom 1c and on the other side by the facing end of the rod 1b. A sensor 5 sensitive to magnetic induction is disposed in this air gap 4, as appears more clearly on the enlarged view which is detail A, shown in FIG. 1A. This sensor 5 can be constituted by an electrical resistance sensitive to induction or, preferably, by a Hall effect sensor.

It will be understood that the intensity of the magnetic flux induced by the magnet in the magnetic circuit (1a, 1b, 1c) is proportional to the depth of penetration e of the magnet into the member 1.

The sensor 5 thus delivers an electrical signal representative of this depth of penetration, and hence of the position of the movable member along the axis X, to electronic means 6 designed to derive a measurement of this position.

As has been seen above, the sensor 5 functions correctly only if it is subjected to magnetic induction of at least about 10 mT.

To achieve this level of induction with a sensor comprising a magnet 2 of low cost, of ferrite for example, the invention provides incorporating in the sensor of FIG. 1 concentration means, in the air gap 4, of magnetic flux circulating in the circuit (1a, 1b, 1c).

To do this, the bottom 1c of this circuit has, for example, a substantially truncated conical shape whose cross-section in a plane perpendicular to the axis X has a surface which decreases as this cross-section approaches the air gap 4.

It will be understood that the lines of force of magnetic induction in the circuit which develop over all the tubular portion 1a of the member 1 from the external surface of the magnet 2, converge radially in the bottom 1c toward the air gap 4, thereby concentrating before crossing this air gap, to form a loop with the magnet 2, through the wall of the axial hole 3 pierced in this magnet.

This concentration, by the magnetic lensing effect due to the given truncated conical shape, according to the invention, at the bottom 1c of the member 1, permits increasing substantially the level of magnetic induction in the air gap, according to the ratio $S_1/S_2$ of the surface $S_1$ of the straight annular cross-section S—S of the portion 1a of the member 1, shown in FIG. 1B, to the surface $S_2$ of the end of the bottom 1c which delimits one side of the air gap 4. This ratio can be very high.

Preferably, the surface $S_2$ will be greater than that of the sensitive portion of the Hall effect sensor 5, to avoid any edge effect unfavorable to the homogeneity of the induction in this sensitive portion, and hence to the precision of the signal delivered by the sensor.

By way only of illustrative and non-limiting example, the end of the bottom 1c of the surface $S_2$, could have a diameter of about 2 to 3 mm, if the sensitive portion of the sensor has a diameter of about 1 mm.

Figure 2:
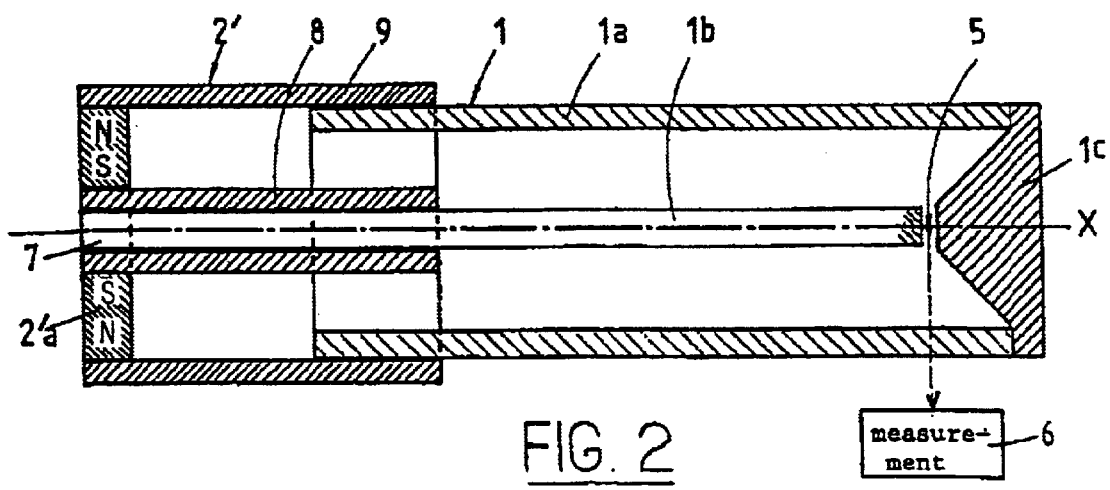
FIG. 2 is a schematic representation in axial cross-section of a second embodiment of sensor according to the invention.

There is shown in FIG. 2 of the accompanying drawing another embodiment of the present invention, which differs from the preceding one only by the structure of the magnetic member.

In this FIG. 2, it will be seen that this magnetized member 2' is constituted by a permanent magnet 2'a in the form of a circular ring with radial magnetization and pierced by a central hole 7, and by first and second cylindrical flux guides 8 and 9 respectively, fixed on the permanent magnet 2'a at the periphery of the hole 7 and at the periphery of the magnet, respectively. The guides 8 and 9 respectively enclose the rod-shaped portion 1b and the tubular portion of the member 1, by prolonging the latter to constitute together a magnetic circuit generally according to that of FIG. 1.

The embodiment of FIG. 2 is advantageous in that the production of the magnet, in the form of a ring of small thickness, is easier and hence less costly, and in that the flux guides also ensure a mechanical guiding, from the outside, of better quality.

It will now be seen that the invention permits achieving the announced object, namely the production at reasonable cost of a magnetic position sensor whose performance is comparable to that which will be obtained, without the invention, with a more costly sensor.

It will also be seen that the invention has other advantages. Thus, the sensor having symmetry of revolution about its axis, no parasitic couple can be exerted on that of the members of the sensor which is movable, the guidance of this member being simplified. The production and assembly of the sensor are also simplified because all the pieces constituting it are tubular. The guidance of the magnet by the central rod improves the insensitivity of the sensor to movements in a direction other than that of the axis of the rod.

Of course, the invention is not limited to the embodiments described and illustrated which have been given only by way of example. Thus, the modes of embodiment described above, designed to detect the position of a movable member over a rectilinear trajectory, could be easily adapted by those skilled in the art to a curvilinear trajectory, by providing a corresponding shape to the longitudinal axis of the sensor.

What is claimed is:

1. Magnetic sensor of the position of a movable member over a trajectory followed by said movable member, comprising first (1) and second (2, 2') members movable relative to each other, one of the members being secured to said movable member and the other fixed, said fixed member (1) defining a circuit of ferromagnetic material having at least one air gap (4) provided with a sensor (5) delivering a signal representative of the magnetic induction prevailing in said air gap (4), said second member (2, 2') comprising a permanent magnet in magnetic coupling relation with said first member (1) to close said magnetic circuit, the sensor moreover comprising means (6) supplied with said signal to derive from it a measurement of said position, wherein said first member (1) comprises a tubular portion (1a) and a portion in the form of a rod (1b) extending along the axis (X) of said tubular portion (1a), said portions being magnetically coupled, at one end, by said second member (2, 2') of which said permanent magnet (2, 2'a) has a radial magnetization and, at the other end, by means (1c) for concentrating magnetic flux in said air gap (4), this latter being delimited by said concentration means (1c) and the facing end of the rod-shaped portion (1b) of said first member (1).

2. Sensor according to claim 1, wherein said means (1c) for concentrating flux have, in cross-section in a plane perpendicular to the axis (X) of the first member (1), a surface which decreases when the section approaches said air gap (4).

3. Sensor according to claim 2, wherein the surface ($S_1$) of the end section of said concentration means is greater than that ($S_2$) of the sensitive surface of the sensor.

4. Sensor according to claim 3, wherein said sensor (5) is a Hall effect sensor.

5. Sensor according to claim 1, wherein said permanent magnet (2) is of elongated shape, complementary to that of the tubular portion (1a) of said first member (1), so as to be able to enter the latter, the rod-shaped portion (1b) of this member (1) passing through an axial hole (3) in said magnet (2).

6. Sensor according to claim 1, wherein said permanent magnet (2'a) has the shape of a circular ring pierced by a central hole (7), said ring being associated with first (8) and second (9) tubular magnetic flux guides, coaxial with the ring and fixed to this latter at the periphery of the hole (7) and the periphery of the ring, respectively, said first (8) and second (9) tubular guides being axially movable with the ring relative to said rod-shaped (1b) and tubular (1a) portions, respectively, of said first member (1).

7. Sensor according to claim 1, wherein said tubular portion (1a) has a straight longitudinal axis (X).

8. Sensor according to claim 1, wherein said tubular portion (1a) has a curvilinear longitudinal axis.

9. A magnetic sensor for determining a position of a movable member, comprising:

an ferromagnetic element defining an air gap, said element comprising a tubular portion, a rod-shaped portion extending along a longitudinal axis of said tubular portion and a portion with a decreasing section at one end of said tubular portion, said air gap being delimited by said portion with a decreasing section and an end of the rod-shaped portion;

a permanent magnet in magnetic coupling relation with said element to close said magnetic circuit, said element and said permanent magnet being movable relative to each other, said permanent magnet being connected to the movable member;

a sensor in said air gap delivering a signal representative of a magnetic induction prevailing in said air gap; and a measuring device to measure said signal to derive a measurement of a position of the movable member, wherein said rod-shaped portion is magnetically coupled to said tubular portion, at one end, by said permanent magnet and, at the other end, by said portion with a decreasing section for concentrating magnetic flux in said air gap.

10. The sensor according to claim 9, wherein said portion with a decreasing section, in cross-section in a plane perpendicular to the longitudinal axis decreases when the section approaches said air gap.

11. The sensor according to claim 9, wherein said permanent magnet is an elongate annular member having an axial hole, said permanent magnet slidingly engaging said tubular portion, so that the rod-shaped portion passes through said axial hole.

12. The sensor according to claim 9, wherein said permanent magnet is an annular ring having a central hole and first and second tubular magnetic flux guides, so that said first and second tubular guides are axially slidable against said tubular portion and so that said rod-shaped portion passes through said central hole.

* * * * *